United States Patent
Zhang et al.

(10) Patent No.: US 10,565,684 B2
(45) Date of Patent: Feb. 18, 2020

(54) SUPER-RESOLUTION METHOD AND SYSTEM, SERVER, USER DEVICE AND METHOD THEREFOR

(71) Applicant: BOE Technology Group Co., Ltd., Beijing (CN)

(72) Inventors: Lijie Zhang, Beijing (CN); Jianmin He, Beijing (CN); Pablo Navarrete Michelini, Beijing (CN); Xingxing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 83 days.

(21) Appl. No.: 15/526,138

(22) PCT Filed: Feb. 3, 2016

(86) PCT No.: PCT/CN2016/073361
§ 371 (c)(1),
(2) Date: May 11, 2017

(87) PCT Pub. No.: WO2017/036092
PCT Pub. Date: Mar. 9, 2017

(65) Prior Publication Data
US 2017/0316548 A1 Nov. 2, 2017

(30) Foreign Application Priority Data
Sep. 6, 2015 (CN) .......................... 2015 1 0559699

(51) Int. Cl.
*G06K 9/62* (2006.01)
*G06K 9/32* (2006.01)
(Continued)

(52) U.S. Cl.
CPC ............ *G06T 3/4053* (2013.01); *G06F 16/51* (2019.01); *G06F 16/56* (2019.01);
(Continued)

(58) Field of Classification Search
CPC ..................................................... G06K 9/6269
(Continued)

(56) References Cited

U.S. PATENT DOCUMENTS 7,792,353 B2 * 9/2010 Forman .................. G06N 20/00
382/159
8,526,765 B2 * 9/2013 Sakaguchi ............ G06T 3/4053
348/538

(Continued)

FOREIGN PATENT DOCUMENTS

CN 1820504 A 8/2006
CN 102088597 A 6/2011
(Continued)

OTHER PUBLICATIONS

Oct. 27, 2017—(CN) First Office Action Appn 201510559699.X with English Tran.
(Continued)

*Primary Examiner* — Kathleen Y Dulaney
(74) *Attorney, Agent, or Firm* — Banner & Witcoff, Ltd.

(57) ABSTRACT

A super-resolution method, a super-resolution system, a user equipment and a server. The super-resolution method includes: training an image sample at a server; obtaining a server-side image database; updating a local image database in a user device by using the server-side image database; and displaying an input low-resolution image as a high-resolution image.

12 Claims, 4 Drawing Sheets

(51) Int. Cl.
  *G06K 9/40* (2006.01)
  *G06T 3/40* (2006.01)
  *G06F 16/51* (2019.01)
  *G06F 16/56* (2019.01)
  *G06F 16/583* (2019.01)
  *G06K 9/00* (2006.01)
  *G06K 9/46* (2006.01)

(52) U.S. Cl.
  CPC ..... *G06F 16/5838* (2019.01); *G06K 9/00624* (2013.01); *G06K 9/4604* (2013.01); *G06K 9/6202* (2013.01); *G06K 9/6269* (2013.01); *G06K 9/6274* (2013.01)

(58) Field of Classification Search
  USPC .......................................... 382/159, 254, 299
  See application file for complete search history.

(56) References Cited

U.S. PATENT DOCUMENTS

| | | | | |
|---|---|---|---|---|
| 8,605,141 | B2* | 12/2013 | Dialameh | A61H 3/061 348/62 |
| 9,865,036 | B1* | 1/2018 | Liu | G06T 3/4053 |
| 2003/0108252 | A1* | 6/2003 | Carrig | G06T 3/4053 382/299 |
| 2004/0218834 | A1* | 11/2004 | Bishop | H04N 19/587 382/299 |
| 2005/0216836 | A1* | 9/2005 | Duke | G06F 17/248 715/245 |
| 2008/0175491 | A1* | 7/2008 | Kondo | H04N 19/105 382/232 |
| 2008/0186390 | A1* | 8/2008 | Sato | G06T 3/4053 348/222.1 |
| 2011/0037894 | A1* | 2/2011 | Sbaiz | G06T 1/00 348/441 |
| 2011/0221599 | A1* | 9/2011 | Hogasten | H01L 27/14609 340/632 |
| 2012/0027290 | A1* | 2/2012 | Baheti | G06K 9/4671 382/154 |
| 2013/0024501 | A1* | 1/2013 | Tahan | G06F 3/0481 709/203 |
| 2013/0034313 | A1* | 2/2013 | Lin | G06N 20/00 382/299 |
| 2013/0223734 | A1* | 8/2013 | Tuzel | G06T 3/4053 382/167 |
| 2013/0301933 | A1 | 11/2013 | Salvador et al. | |
| 2014/0072232 | A1 | 3/2014 | Zheng et al. | |
| 2014/0139643 | A1* | 5/2014 | Hogasten | H01L 27/14609 348/48 |
| 2014/0321738 | A1* | 10/2014 | Shibata | G06T 5/003 382/160 |
| 2014/0334720 | A1* | 11/2014 | Shibata | G06T 5/003 382/159 |
| 2014/0354886 | A1* | 12/2014 | Michaeli | H04N 1/4092 348/607 |
| 2015/0063629 | A1* | 3/2015 | Gueguen | G06K 9/66 382/103 |
| 2015/0117762 | A1* | 4/2015 | Shibata | H04N 19/97 382/159 |
| 2015/0255066 | A1* | 9/2015 | Wilder | G06K 9/00744 704/235 |
| 2015/0302566 | A1* | 10/2015 | Shibata | G06T 5/001 382/159 |
| 2016/0034809 | A1* | 2/2016 | Trenholm | H04L 41/5041 706/20 |
| 2016/0086078 | A1* | 3/2016 | Ji | G06K 9/6267 382/157 |
| 2016/0210749 | A1* | 7/2016 | Nguyen | A61B 5/00 |
| 2018/0302663 | A1* | 10/2018 | Yoshizawa | H04N 21/4312 |

FOREIGN PATENT DOCUMENTS

| | | |
|---|---|---|
| CN | 102202205 A | 9/2011 |
| CN | 102881000 A | 1/2013 |
| CN | 102968766 A | 3/2013 |
| CN | 103136727 A | 6/2013 |
| CN | 103167284 A | 6/2013 |
| CN | 103729430 A | 4/2014 |
| CN | 103839242 A | 6/2014 |
| CN | 105205782 A | 12/2015 |

OTHER PUBLICATIONS

May 27, 2016—(WO) International Search Report and Written Opinion Appn PCT/CN2016/073361 with English Tran.
Jul. 19, 2018—(CN) Second Office Action Appn 201510559699.X with English Translation.

* cited by examiner

SUPER-RESOLUTION METHOD AND SYSTEM, SERVER, USER DEVICE AND METHOD THEREFOR

The application is a U.S. National Phase Entry of International Application No. PCT/CN2016/073361 filed on Feb. 3, 2016, designating the United States of America and claiming priority to Chinese Patent Application No. 201510559699.X filed on Sep. 6, 2015. The present application claims priority to and the benefit of the above-identified applications and the above-identified applications are incorporated by reference herein in their entirety.

TECHNICAL FIELD

Embodiments of the present disclosure relate to a super-resolution method, a super-resolution system, a user device and a server.

BACKGROUND

High resolution of an image refers to that pixels contained by the image have high density, which can provide abundant detailed information, and can describe an objective scene more accurate and meticulous. A high-resolution image is widely desired in an information age, and is significantly applied in fields such as satellite remote sensing images, video security monitoring, military detection aerial photography, medical digital imaging, and video standard conversion.

Current image super-resolution technologies are mainly divided into two categories: a reconstruction-based super-resolution technology and a learning-based super-resolution technology. In the reconstruction-based super-resolution technology, all the information can only be obtained from input image data, without any additional background knowledge, and the whole resolution process is equivalent to an information extraction and information fusion process. As a resolution amplification factor increases, a quantity of input image samples that need to be provided increases dramatically; however, after an upper limit of the amplification factor is reached, no matter how many input image samples are added, it is impossible to improve a reconstruction effect.

In view of limitation of a reconstruction algorithm, the learning-based super-resolution technology has emerged as a frontier research field. The method generates a learning model by using an image training set, and creates details of the image with high occurring frequencies by using the model. The learning-based super-resolution method greatly improves image quality, but it also has some deficiencies, that is, a local image database collects currently existing video images as training samples, which have already been fixed and are unchangeable, and so there is a certain degree of limitation to improve the effect of the image quality.

Therefore, there is a need of a super-resolution technology which can further improve the image quality.

SUMMARY

Embodiments of the present disclosure provide a super-resolution method, a super-resolution system, a user device, and a server, which can further improve image quality.

Embodiments of the disclosure provide a super-resolution method, comprising: training image samples at a server; obtaining a server-side image database; updating a local image database in a user device by using the server-side image database; and displaying an input low-resolution image as a high-resolution image.

In an example, training the image samples at the server includes: receiving image samples uploaded to the server or downloaded to the server, and making a selection on the image samples; categorizing the selected image samples; performing training according to a category of the selected image samples to obtain a new parameter of the category.

In an example, obtaining the server-side image database includes: updating a template vector and a low-resolution-high-resolution dictionary block in the server-side image database by using the selected image samples and the new parameter of the category of the selected image samples.

In an example, updating the local image database in the user device by using the server-side image database includes: updating at least one of a template vector and a low-resolution-high-resolution dictionary block in local image data.

In an example, the template vector has different levels.

In an example, the image samples are images or a video.

Embodiments of the disclosure provide a method for performing super-resolution in a user device, comprising: receiving update data from a server to update a local image database in the user device; and displaying an input low-resolution image as a high-resolution image based on the local image database in the user device.

In an example, receiving update data from the server to update the local image database in the user device includes: updating at least one of a template vector and a low-resolution-high-resolution dictionary block in local image data.

In an example, displaying the input low-resolution image as the high-resolution image based on the local image database in the user device includes: preprocessing the input low-resolution image; performing categorization and feature extraction on the preprocessed low-resolution image; matching the low-resolution image based on the local image database; and performing an image fusion on the matched low-resolution image to display the high-resolution image.

In an example, the template vector has different levels, and updating the template vector in the local image data includes selecting a level of the template vector to perform updating.

Embodiments of the disclosure provide a method for performing super-resolution on a server, comprising: training image samples at a server; obtaining a server-side image database; and displaying an input low-resolution image as a high-resolution image based on the server-side image database, wherein update data is transmitted to a user device to update a local image database in the user device.

In an example, training image samples at the server includes: receiving the image samples uploaded to the server or downloaded to the server, and performing selection on the image samples; categorizing the selected image samples; and performing training according to a category of the selected image samples to obtain a new parameter of a category of the selected image samples.

In an example, obtaining the server-side image database includes: updating a template vector and a low-resolution-high-resolution dictionary block in the server-side image database by using the selected image samples and the new parameter of the category of the selected image samples.

In an example, transmitting update data to the user device to update the local image database in the user device includes: updating at least one of a template vector and a low-resolution-high-resolution dictionary block in local image data.

In an example, the template vector has different levels.

In an example, the image samples are images or a video.

Embodiments of the disclosure provide a super-resolution system comprising a server and a user device, configured to perform the super-resolution method described above.

Embodiments of the disclosure provide a user device, configured to perform the method described above.

Embodiments of the disclosure provide a server, configured to perform the method described above.

According to embodiments of the present disclosure, a local image database in the user device is not fixed, and the local image database may be updated with a server-side image database, and therefore, it can be ensured that the local image database is up-to-date, so as to further improve the image quality, and improvement of the image quality is dynamic.

BRIEF DESCRIPTION OF THE DRAWINGS

Those skilled in the art can better understand the present disclosure, with detailed description of the accompanying drawings, wherein identical reference numerals indicate units with an identical structure, and in which.

DETAILED DESCRIPTION

The technical solutions of the embodiment will be described in a clearly and fully understandable way in connection with the drawings related to the embodiments of the present disclosure. It is obvious that the described embodiments are just a part but not all of the embodiments of the present disclosure. Based on the embodiments in the present disclosure, those skilled in the art can obtain other embodiment(s), without any inventive work, which should be within the scope of the present disclosure.

Figure 1:
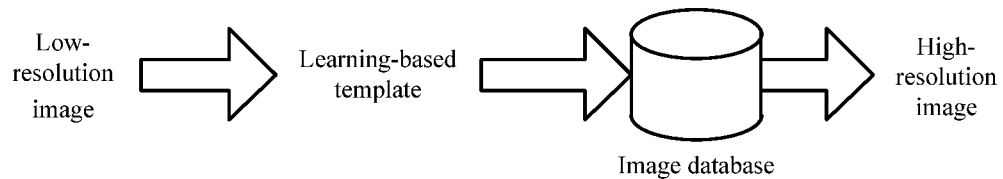
FIG. 1 shows a conceptual view of a learning-based super-resolution technology.

FIG. 1 shows a conceptual view of a learning-based super-resolution technology.

As shown in FIG. 1, a low-resolution image is received locally (generally at the user device), the low-resolution image is matched by a learning-based template, an image database is used for performing image fusion and other processes, and finally, a high-resolution image corresponding to the low-resolution image is output.

Figure 2:
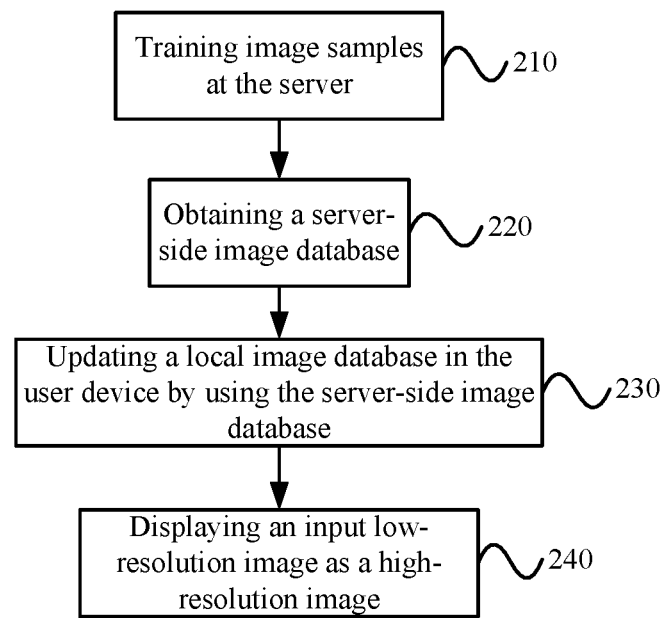
FIG. 2 shows a schematic flow diagram of a super-resolution method according to an embodiment of the present disclosure.

FIG. 2 shows a schematic flow diagram of a super-resolution method 200 according to an embodiment of the present disclosure.

As shown in FIG. 2, in S210 of the super-resolution method 200, image samples are trained at the server; in S220, a server-side image database is obtained; in S230, a local image database in the user device is updated by using the server-side image database; and in S240, an input low-resolution image is displayed as a high-resolution image.

According to embodiments of the present disclosure, a local image database in the user device is not fixed, and the local image database may be updated with a server-side image database, and therefore, it can be ensured that the local image database is up-to-date, so as to further improve the image quality, and improvement of the image quality is dynamic.

Figure 3:
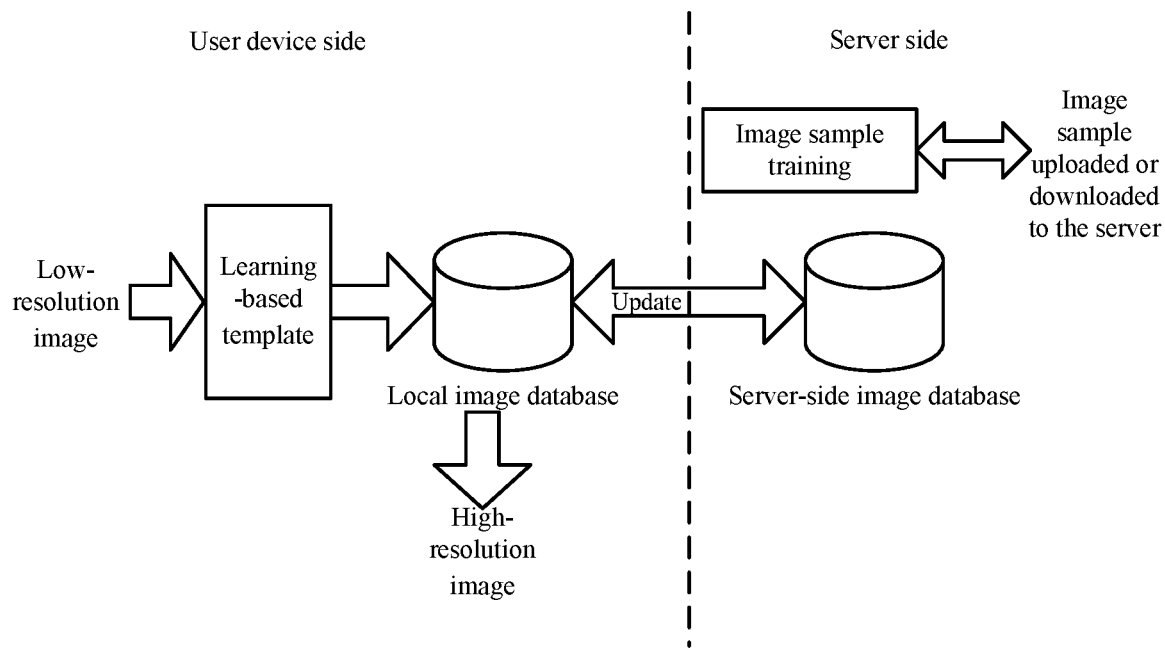
FIG. 3 shows a conceptual view of a super-resolution process according to an embodiment of the present disclosure.

FIG. 3 shows a conceptual view of a super-resolution process according to an embodiment of the present disclosure.

As shown in FIG. 3, the image samples uploaded to the server or downloaded to the server by a user can be trained through a sample training system on the server. With development of the Internet, a user community will be more and more huge, the samples that are available for collection and uploaded to the server side or downloaded to the server side by users will be more abundant, and even some feature modules which have not been originally collected will appear. Abundance of the samples allows a training process to obtain finer results, so as to improve accuracy of matching, and to further improve image quality of a finally-output high-resolution image. Here, the server may be a cloud server, and the image samples available for collection may be images or videos.

The local image database may be updated periodically at a request of a local user on a user device side or by the server, and because the user device may also have a sample training function, data in the local image database may be transferred to the server-side image database. In this way, it can be ensured that the data in the local image database and the data in the server-side image database are synchronized, so that a high-quality high-resolution image can be obtained either based upon the local image database or the server-side image database.

In addition, according to another embodiment of the present disclosure, when a large number of image samples are trained on the server, the quantity of samples is sufficient, so that the training may be performed on different categories to obtain parameters of each category.

Figure 4:
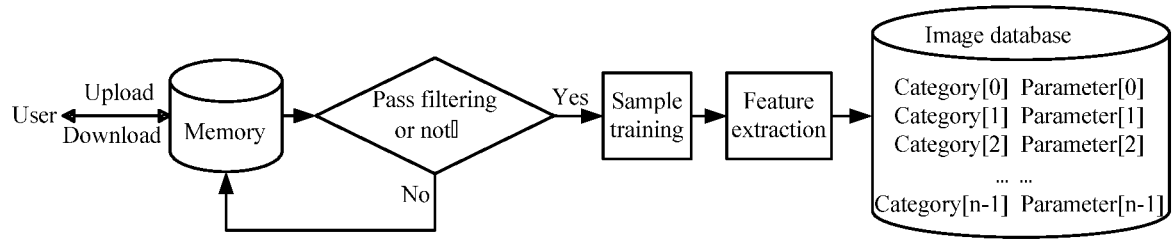
FIG. 4 shows an exemplary view of a specific process of training image samples in a server according to an embodiment of the present disclosure.

FIG. 4 shows an exemplary view of a specific process of training image samples in a server according to an embodiment of the present disclosure.

As shown in FIG. 4, a user performs uploading or downloading on the server (e.g., the cloud server), the server receives various image samples uploaded to or downloaded to it, and these image samples may be temporarily stored in a memory of the server. The collected image samples may be images or video images, such as every frame, a designated frame, and/or a key frame of video images. Then, the image samples may be selected (filtered), to select image samples suitable as training objects. Here, the filtering may be performed so as to start training each time when a new image or video image is uploaded or downloaded; or, the filtering may also be performed according to a predetermined time period, for example, every 24 hours, every week, etc., and the predetermined time period may be default by the system or set by the user. In addition, the filtering may further be performed to start training at the request of the user.

In one example, as a criterion for selection, a high-resolution image, i.e., an image having a high-resolution image block feature, may be selected for training. Here, the image having the high-resolution image block feature may be referred to as an image having a high-quality image feature block, for example, an image having a high sharpness, an image having a larger size, a non-compressed or less-compressed image, a bmp/tif/png and other images of a non-compressed format, and so on.

Thereafter, the selected image samples are categorized. In practical application, when an image or a video is uploaded or downloaded to the server, a corresponding content category parameter is fed back by using an image/video content recognition mechanism, and a corresponding category library is found by matching the content category parameter, and the image or video is stored according to the category. Thus, when an image or a video in the memory is selected as a to-be-trained image sample, the image sample itself may already include category information (e.g., a category identifier), and a category of the image sample can be known just by reading the category information. Of course, it is also feasible to perform the above-described image/video content recognition mechanism after the image sample is selected. The categories of image samples may include, for example, tourism, entertainment, anime, variety, movies, education, and the like.

If an image or a video is not selected, that is, the image or the video fails to pass the filtering, no subsequent operation is performed, and new images or videos continue to be read from the memory.

Next, training is performed according to the category of the image sample, to obtain a new parameter of the category. The trained sample may also be trained by using a low-resolution image block and a high-resolution image block to obtain a pair of a low-resolution dictionary block and a high-resolution dictionary block (e.g., a low-resolution-high-resolution dictionary block). Therefore, a template vector and the low-resolution-high-resolution dictionary block in the server-side image database may be updated, to obtain a new server-side image database.

Any existing and future developed appropriate method may be used for training the image sample, such as a neural network-based learning and training method; however, embodiments of the present disclosure are not limited thereto.

FIG. 4 exemplarily shows content stored in the server-side image database, such as type[0] parameter[0], type[1] parameter [1], . . . , type[n−1] parameter[n−1]; however, it should be understood that each category may include a plurality of parameters. For example, each category may include feature parameters such as person, landscape and color, etc., where each feature parameter may further include detailed parameter information such as edge, shape, contour, angle, and texture, etc. Therefore, the parameters here may be referred to as a set of parameters, and each type may correspond to a plurality of parameters or sets of parameters.

Table 1 below shows an example of a parameter category list library stored in the image database, where n is a natural number.

TABLE 1

| Parameter category list library | | | | | |
|---|---|---|---|---|---|
| Category [0] | | Category [1] | | ... Category [n-1] | |
| Parameter $[0]_0$ | Parameter $[1]_0$ ...... | Parameter $[0]_1$ | Parameter $[1]_1$ ...... | Parameter $[0]_{n-1}$ | Parameter $[1]_{n-1}$ ...... |

As shown in Table 1, n categories may be stored in the parameter category list library, and each category corresponds to a plurality of parameters or sets of parameters. The number of parameters or sets of parameters included in each category may be the same or different. Each category-parameter pair or category-parameter-set pair may be referred to as a template vector.

By categorizing the image samples and separately training the categorized image samples, an accumulation error effect in an iterative process due to excessively complicated training samples may be avoided, and by training different categories separately, a stronger pertinence and a better super-resolution effect can be achieved.

In one example, a template vector may have different levels. A template vector here may refer to one or more filtering parameters needed by the entire super-resolution process. Because the method used in training is deep learning, that is, a solution of relevant hierarchical training to simulate human visual experience and his/her learning method, a template vector with different levels may refer to filtering parameters trained with different levels. Filtering parameters of different levels may be used to obtained different types of feature blocks (obtained by filtering the images), and the image feature blocks may have higher feature complexity with progressive ascending of the levels. For example, an image feature block of a higher level may render more details (such as texture) and colors, and so on, so that feature combination of any image can be satisfied. In addition, parameters and the number of parameters included in a template vector of a different level may be different. Usually, a template vector with a higher level needs more storage space and spending more time on matching, but can obtain a more accurate and more realistic matching effect.

Therefore, users (users at the server side or local users at the user device) may be divided into ordinary users and specific users. For an ordinary user, the super-resolution is performed by using a default template vector (e.g., a template vector with a lower level), which can basically meet the user's needs, and for a specific user who requires a higher quality of image or requires a commercial application, he/she may be authorized to use a template vector with a higher level.

Therefore, the super-resolution method according to the present disclosure allows the user to select the level of the template vector to be used by himself/herself, so as to obtain the image quality desired thereby, which provides a personalized setting function, greatly enhances man-machine interaction, and improves the user's experience, and therefore is more close to the user's subjective feelings.

Hereinafter, with reference to FIG. 5 to FIG. 6, a method of performing super-resolution in a user device will be explained in detail.

Figure 5:
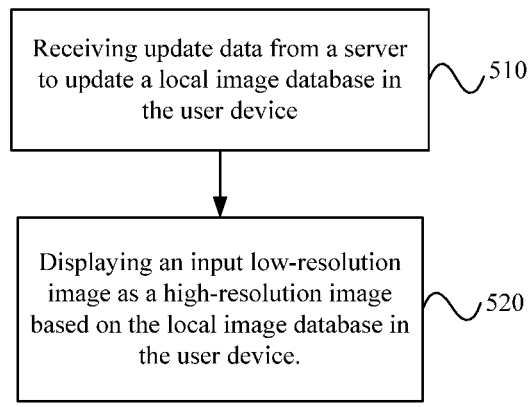
FIG. 5 shows an exemplary flow diagram of a method for performing super-resolution in a user device according to an embodiment of the present disclosure.

FIG. 5 shows an exemplary flow diagram of a method 500 for performing super-resolution in a user device according to an embodiment of the present disclosure.

As shown in FIG. 5, in S510 of the method 500, update data is received from a server to update a local image database in the user device; and in S520, an input low-resolution image is displayed as a high-resolution image based on the local image database in the user device.

Therefore, according to the embodiment of the present disclosure, the local image database in the user device is not fixed, and the local image database can be updated with a server-side image database, and therefore, it can be ensured that the local image database is up-to-date, so as to further improve the image quality, and improvement of the image quality is dynamic.

Figure 6:
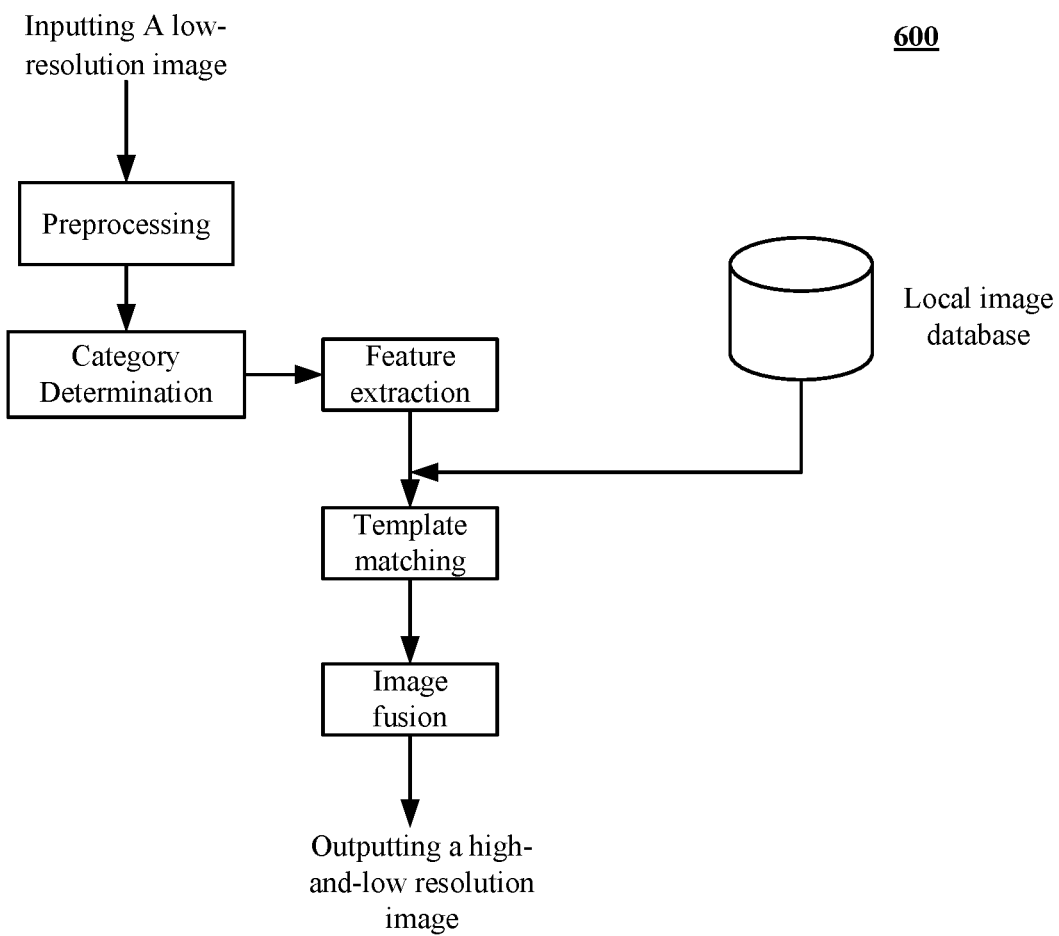
FIG. 6 shows an exemplary flow diagram of a specific process of displaying a low-resolution image as a high-resolution image in a user device according to an embodiment of the present disclosure.

FIG. 6 shows an exemplary flow diagram of a specific process 600 of displaying a low-resolution image as a high-resolution image in a user device according to an embodiment of the present disclosure.

Firstly, an input low-resolution image is subjected to preprocessing. In the process of super-resolution, since the input low-resolution image is often affected by optical blur, motion blur, noise and aliasing factors, firstly, it needs to preprocess the original input low-resolution image so as to avoid interference caused by feature extraction performed on the original image.

Then, the preprocessed low-resolution image is categorized, that is, the category thereof is determined. Here, the category of the input low-resolution image may be determined by using an image/video content recognition mechanism, similar to that at the server side.

Next, feature extraction is performed. Various types of features of the image are extracted from the input low-resolution image. The features, for example, may include: a color feature, a gradient feature, a frequency domain feature (a high-and-low-frequency signal converted from a time domain to a frequency domain), a structure feature, and the like. These features are prerequisites for subsequent template matching processes.

Then, the low-resolution image is matched based on the local image database. In an actual matching process, firstly, low-resolution image feature blocks are matched, and then according to a principle that "each low-resolution image feature block corresponds to a high-resolution image feature block in the dictionary library", high-resolution image blocks corresponding to the respective matched low-resolution image blocks within the low-resolution image are found in the low-resolution-high-resolution dictionary blocks.

In one example, in the matching process, according to a certain criterion, similarity between the two features may be maximized. With a linear transformation as an example, the matching process is as follows:

Firstly, a feature vector X of a feature extracted from the low-resolution image block is calculated, and distances $D_1$, $D_2$, ..., $D_C$ between X and respective template vectors $X_1$, $X_2$, ..., $X_C$ are calculated, where C is a natural number, for example, a total number of template vectors. Here, $D_i$ may be, for example, a minimum residual error; however, the embodiment of the present disclosure is not limited thereto.

If $D_i=\min\{D_j\}$, j=1, 2, 3, ... C, and $D_i<\varepsilon$, it may be determined that the sample X belongs to an i-th template vector, denoted as $X \in W_i$; if all $D_i$ (i=1, 2, ..., C) are greater than $\varepsilon$, it is determined to reject matching. After the matching is rejected, this time of matching ends. Rejection of the matching results in failure of matching the low-resolution image block, that is, it is impossible to perform the super-resolution process on the low-resolution image block. A reason for rejection of the matching may be that the template vectors are not accurate enough or the number of the template vectors is too small and so on.

Here, $\varepsilon$ may be an empirical threshold, or may be understood as a minimum parameter value corresponding to an optimal match state obtained after a plurality of rounds of calculation of a loss function.

Finally, an image fusion is performed on the matched low-resolution image blocks, and a high-resolution image is output and displayed.

Here, the image fusion refers to a process of multiplying the most appropriate complex feature blocks obtained by matching with one or more coefficients, performing a weighted calculation, to obtain a final high-resolution image.

The feature information between the original image and the dictionary image block corresponding to each template vector obtained by the previous matching has redundancy and complementarity of information. The feature of the image is subjected to categorization and identification. By feature fusion, relevant feature information can be excavated in the original image, credibility of the feature information is increased, a false feature is eliminated, and a new composite feature is established, so that the composite image obtained by an image fusion technology can restore the original image more comprehensively and accurately.

A linear or non-linear transformation is performed between feature information of the original image feature block and the dictionary image block, so that a difference of the two data sets after transformation reaches a minimum value of a certain criterion, which is an image registration process. Then, by using a registration result, useful information is fused and expressed in a same coordinate system as an image, and finally, the feature parameter is extracted and measured from the fused image, and qualitatively and quantitatively analyzed to obtain a final coefficient and weight.

The user device according to an embodiment of the present disclosure may receive the update data from the server for updating the local image database in the user device. Here, the updating may include updating at least one of the template vectors and the low-resolution-high-resolution dictionary blocks in the local image data. Therefore, it can be ensured that the local image database is up-to-date, so as to further improve the image quality, and improvement of the image quality is dynamic.

In addition, because the template vectors and the low-resolution-high-resolution dictionary blocks at the server side are obtained by training with a large amount of data, and so, by using data from the server for updating the local image database in the user device, a probability of rejection of matching can be reduced.

In addition, the updating of the template vectors in the local image data may further include performing updating by selecting levels of the template vectors. The selecting may be performed by the user. This provides a personalized setting function, greatly enhances man-machine interaction, and improves the user's experience, which is more close to the user's subjective feelings.

Figure 7:
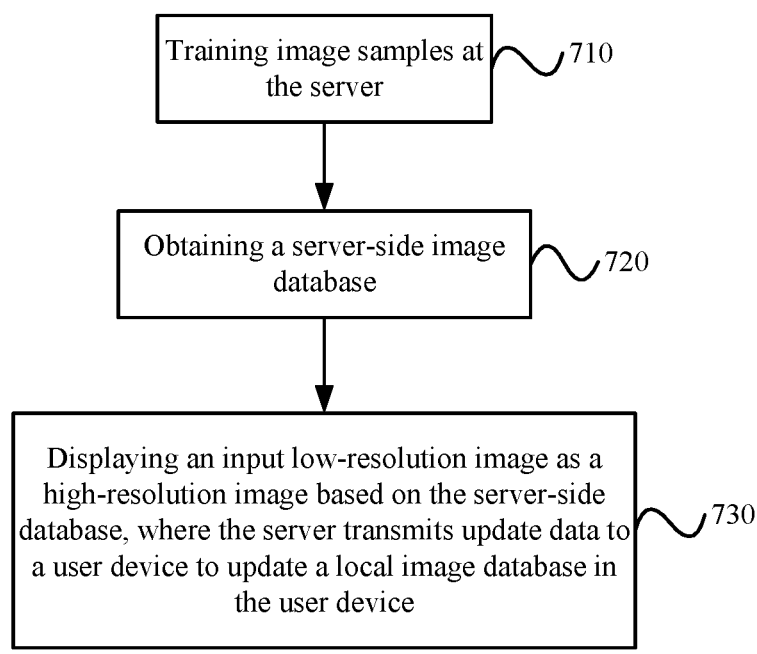
FIG. 7 shows an exemplary flow diagram of a method for performing super-resolution on a server according to an embodiment of the present disclosure.

FIG. 7 shows an exemplary flow diagram of a method 700 for performing super-resolution on a server according to an embodiment of the present disclosure.

As shown in FIG. 7, in S710 of the method 700, image samples are trained at the server; in S720, a server-side image database is obtained; and in S730, an input low-resolution image is displayed as a high-resolution image based on the server-side database, where the server transmits update data to the user device to update the local image database in the user device.

According to embodiments of the present disclosure, a local image database in the user device is not fixed, and the local image database may be updated with a server-side image database, and therefore, it can be ensured that the local image database is up-to-date, so as to further improve the image quality, and improvement of the image quality is dynamic.

In addition, the image samples may be trained according to the method described with reference to FIG. 4, so that by categorizing the image samples and training the categorized samples separately, an accumulation error effect in an iterative process due to excessively complicated training samples may be avoided. Furthermore, by training different categories separately, the method may have a stronger pertinence and a better super-resolution effect.

In one example, obtaining the server-side image database may include: updating a template vector and low-resolution-high-resolution dictionary blocks in the server-side image database by using an image sample and a new parameter of a category of the image sample.

In one example, transmitting update data to the user device to update the local image database in the user device includes: updating at least one of the template vectors and the low-resolution-high-resolution dictionary blocks in the local image data.

In one example, the template vectors have different levels.

An embodiment of the present disclosure further provides a server and a super-resolution system of a user device, which can perform the super-resolution method as described above.

An embodiment of the present disclosure further provides a user device, which can perform the method as described with reference to FIG. 5 and FIG. 6.

An embodiment of the present disclosure further provides a server, which can perform the method as described with reference to FIG. 7.

The foregoing embodiments merely are specific implementation modes of the present disclosure, but a protection scope of the present disclosure is not limited thereto, changes or replacements easily conceived by any skilled in art within the technical scope disclosed by the present disclosure should be covered by the protection scope of the present disclosure. Therefore, the protection scope of the present disclosure is determined by a protection scope of claims.

The present application claims priority of the Chinese Patent Application No. 201510559699.X filed on Sep. 6, 2015, the disclosure of which are incorporated herein by its reference in its entirety as part of the present application.

The invention claimed is:

1. A super-resolution method, comprising:
training image samples at a server, including:
receiving new image samples, and making a selection on the new image samples to select image samples among the new image samples;
obtaining a category for each of the selected image samples; and
performing training according to the category for each of the selected image samples to obtain a new parameter or a new set of parameters of the category for each of the selected image samples;
obtaining a server-side image database, including:
updating a template vector in the server-side image database and a low-resolution-high-resolution dictionary block in the server-side image database by using each of the selected image samples and the new parameter or the new set of parameters of the category of each of the selected image samples;
using the server-side image database, updating a local image database in a user device by updating a template vector in the local image database and a low-resolution-high-resolution dictionary block in the local image database based on the updated template vector in the server-side image database and the low-resolution-high-resolution dictionary block in the server-side image database, wherein the template vector in the server-side image database and the template vector in the local image database include the category and the new parameter or the new set of parameters of the category; and
displaying an input low-resolution image as a high-resolution image.

2. The super-resolution method according to claim 1, wherein the template vector in the server-side image database and the template vector in the local image database have different levels.

3. The super-resolution method according to claim 1, wherein the image samples are images or a video.

4. A method for performing super-resolution in a user device, comprising:
receiving update data from a server and updating a template vector in a local image database in the user device and a low-resolution-high-resolution dictionary block in the local image database, wherein the template vector includes a category and parameters corresponding to the category, wherein the update data is obtained by the server performing the following steps:
receiving new image samples, and making a selection on the new image samples to select image samples among the new image samples;
obtaining a category for each of the selected image samples;
performing training according to the category for each of the selected image samples to obtain a new parameter or a new set of parameters of the category for each of the selected image samples; and
updating a template vector in a server-side image database and a low-resolution-high-resolutions dictionary block in the server-side side image database by using each of the selected image samples and the new parameter or the new set of parameters of the category of each of the selected image samples, wherein the updated template vector in the server-side image database and the low-resolution-high-resolution dictionary block in the server-side image database are served as the update data; and
based on the local image database, displaying an input low-resolution image as a high-resolution image.

5. The method according to claim 4, wherein the displaying the input low-resolution image as the high-resolution image comprises:
preprocessing the input low-resolution image;
performing categorization and feature extraction on the preprocessed low-resolution image;
matching the low-resolution image based on the local image database; and
performing an image fusion on the matched low-resolution image to display the high-resolution image.

6. The method according to claim 4, wherein the template vector in the server-side image database and the template vector in the local image database have different levels, and
wherein updating the template vector in the local image database includes selecting a level of the template vector to perform updating.

7. A method for performing super-resolution on a server, comprising:
   training image samples at the server, including:
      receiving new image samples, and performing selection on the new image samples to select image samples among the new image samples;
      obtaining a category for each of the selected image samples, and
      performing training according to the category for each of the selected image samples to obtain a new parameter or a new set of parameters of the category for each of the selected image samples;
   obtaining a server-side image database, including:
      updating a template vector in the server-side image database and a low-resolution-high-resolution dictionary block in the server-side image database by using each of the selected image samples and the new parameter or the new set of parameters of the category of each of the selected image samples; and
      transmitting update data to a user device to update a template vector in a local image database in the user device and a low-resolution-high-resolution dictionary block in the local image database based on the updated template vector in the server-side image database and the low-resolution-high-resolution dictionary block in the server-side image database, enabling the user device to display an input low-resolution image as a high-resolution image based on the server-side image database, wherein the template vector in the server-side image database and the template vector in the local image database include the category and the new parameter or the new set of parameters of the category.

8. The method according to claim 7, wherein the template vector in the server-side image database and the template vector in the local image database have different levels.

9. The method according to claim 7, wherein the image samples are images or a video.

10. A super-resolution system comprising a server and a user device, configured to perform the super-resolution method according to claim 1.

11. A user device, comprising a processor and a memory, wherein the memory stores instructions that, when executed by the processor, cause the user device to perform the method according to claim 4.

12. A server, comprising a processor and a memory, wherein the memory stores instructions that, when executed by the processor, cause the server to perform the method according to claim 7.

* * * * *